(12) United States Patent
Corson

(10) Patent No.: US 8,395,658 B2
(45) Date of Patent: Mar. 12, 2013

(54) TOUCH SCREEN-LIKE USER INTERFACE THAT DOES NOT REQUIRE ACTUAL TOUCHING

(75) Inventor: Gregory A. Corson, San Mateo, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 1450 days.

(21) Appl. No.: 11/530,001

(22) Filed: Sep. 7, 2006

(65) Prior Publication Data

US 2008/0062257 A1    Mar. 13, 2008

(51) Int. Cl.
*H04N 13/02* (2006.01)
(52) U.S. Cl. ......................................................... 348/47
(58) Field of Classification Search ............ 348/25–172, 348/384.1–440.1, 699–702, 818–843
See application file for complete search history.

(56) References Cited

U.S. PATENT DOCUMENTS

| | | |
|---|---|---|
| 4,167,756 A | 9/1979 | Smith |
| 5,528,263 A | 6/1996 | Platzker et al. |
| 5,767,842 A | 6/1998 | Korth |
| 5,789,739 A | 8/1998 | Schwarz |
| 5,930,383 A | 7/1999 | Netzer |
| 6,055,330 A | 4/2000 | Eleftheriadis et al. |
| 6,243,054 B1 | 6/2001 | DeLuca |
| 6,559,813 B1 | 5/2003 | DeLuca |
| 6,803,906 B1 | 10/2004 | Morrison et al. |
| 6,911,995 B2 | 6/2005 | Ivanov et al. |
| 7,277,599 B2 * | 10/2007 | Eian et al. ..................... 382/285 |
| 7,558,432 B2 | 7/2009 | Zaharia et al. |
| 7,565,295 B1 | 7/2009 | Hernandez-Rebollar |
| 2001/0015718 A1 * | 8/2001 | Hinckley et al. ............... 345/156 |
| 2001/0020933 A1 * | 9/2001 | Maggioni ...................... 345/156 |
| 2002/0064382 A1 * | 5/2002 | Hildreth et al. ............... 396/100 |
| 2002/0071036 A1 | 6/2002 | Gonzales et al. |
| 2004/0001145 A1 * | 1/2004 | Abbate .................... 348/207.99 |
| 2004/0114033 A1 | 6/2004 | Eian et al. |

FOREIGN PATENT DOCUMENTS

| | | |
|---|---|---|
| EP | 1449358 | 2/2011 |
| FR | 2832892 | 4/2004 |

* cited by examiner

*Primary Examiner* — Richard Torrente
(74) *Attorney, Agent, or Firm* — Fitch, Even, Tabin & Flannery, LLP

(57) ABSTRACT

A system may be controlled by directing at least a portion of a field-of-view of one or more cameras across a screen of a display for the system, using the one or more cameras to track in three dimensions an object moving in a space in front of the screen, and providing input to the system based on the tracking of the object. A system may also be controlled by directing a first portion of a field-of-view of a camera in a first direction, directing a second portion of the field-of-view of the camera in a second direction across a screen of a display for the system, tracking an object moving in front of the screen with the second portion of the field-of-view of the camera, and providing input to the system based on the tracking of the object.

35 Claims, 9 Drawing Sheets

TOUCH SCREEN-LIKE USER INTERFACE THAT DOES NOT REQUIRE ACTUAL TOUCHING

BACKGROUND OF THE INVENTION

1. Field of the Invention

The present invention relates generally to user interfaces, and more specifically to touch screens and pointing devices for use with graphical user interfaces.

2. Discussion of the Related Art

A pointing device is a device that allows a computer user to control the movement of the pointer to select items on the display screen for the computer. Examples of pointing devices include mice, trackballs, joysticks, touchpads, and light pens.

A touch screen is a type of display screen that allows the user to interact with the computer by touching the computer display screen. That is, instead of using a pointing device, the user can use his or her finger to point directly to items on the screen.

It is with respect to these and other background information factors that the present invention has evolved.

SUMMARY OF THE INVENTION

One embodiment provides a method for use in controlling a system, comprising the steps of: directing at least a portion of a field-of-view of one or more cameras across a screen of a display for the system; using the one or more cameras to track in three dimensions an object moving in a space in front of the screen; and providing input to the system based on the tracking of the object.

Another embodiment provides an apparatus for use in controlling a system, comprising: one or more cameras positioned so that at least a portion of a field-of-view of each camera is directed across a screen of a display for the system; wherein the one or more cameras are configured to track in three dimensions an object moving in a space in front of the screen; and means for providing input to the system based on the tracking of the object.

Another embodiment provides a method for use in controlling a system, comprising the steps of: directing a first portion of a field-of-view of a camera in a first direction; directing a second portion of the field-of-view of the camera in a second direction across a screen of a display for the system; tracking an object moving in front of the screen with the second portion of the field-of-view of the camera; and providing input to the system based on the tracking of the object.

Another embodiment provides an apparatus for use in controlling a system, comprising: a camera that is configured so that a first portion of its field-of-view is directed in a first direction and a second portion of its field-of-view is directed in a second direction across a screen of a display for the system; wherein the camera is further configured to track an object moving in front of the screen with the second portion of the field-of-view of the camera; and means for providing input to the system based on the tracking of the object.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein.

DETAILED DESCRIPTION

Touch screens have proven to be very good for casual user interactions with computers, but they have the disadvantage that the screen quickly gets fingerprinted and dirty, which is not something a user wants to happen to the living room big-screen TV.

Embodiments of the present invention allow a person to use his or her finger as a mouse-like pointing device to manipulate a touch screen-like user interface, but without actually touching the screen of the device. By way of example, such embodiments may be implemented in an inexpensive system that allows a big-screen TV to be used as an interface to a home server or the internet without the need for a remote control. This allows the TV to be easily used for casual walk-up interactions such as home control, brief web browsing sessions, checking traffic, weather, etc., where the use of voice control or a remote or hand-held pointing device would be inconvenient. Furthermore, the screen would not get dirty because the user does not have to touch it.

Figure 1:
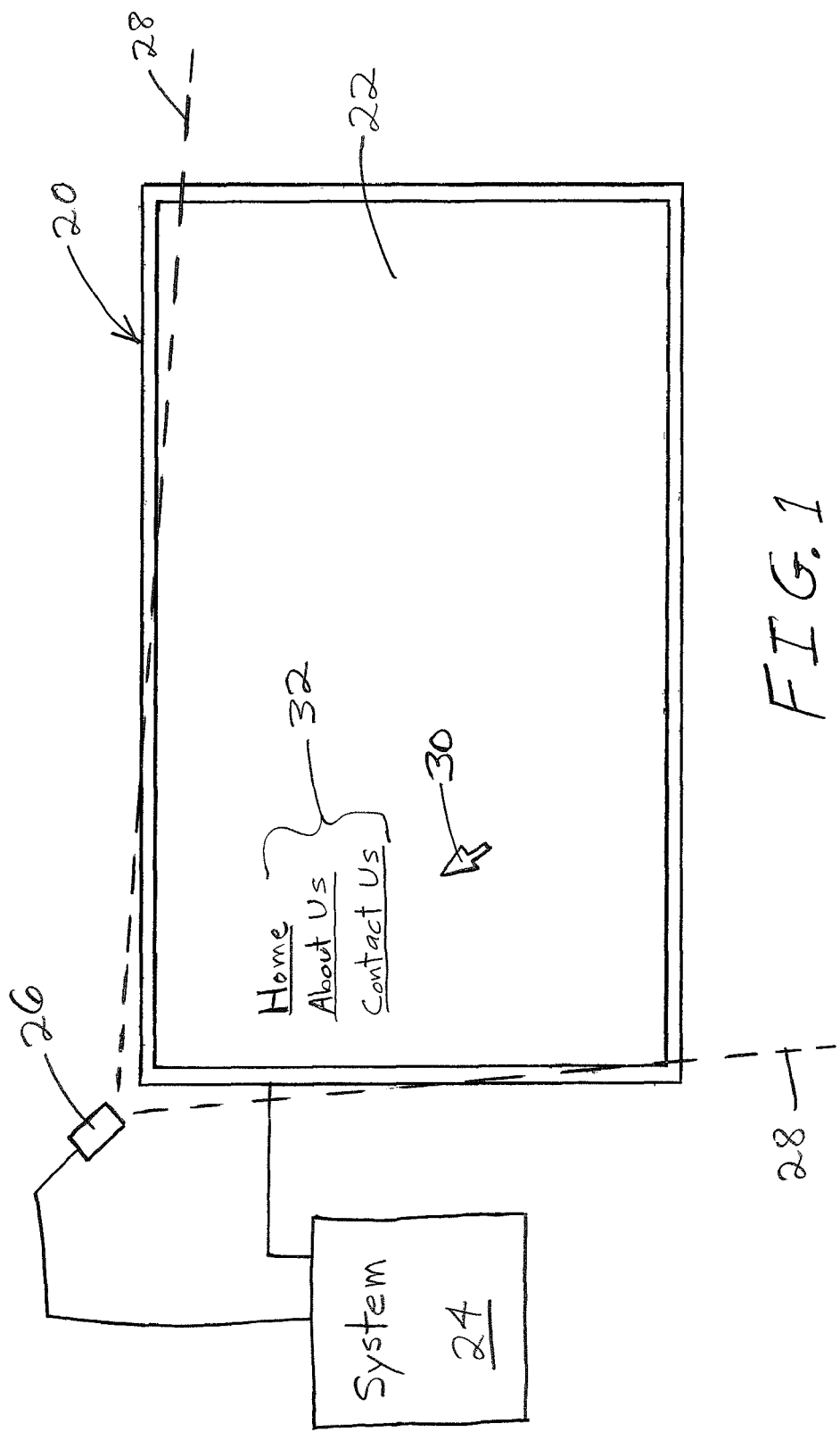
FIG. 1 is a block diagram illustrating an apparatus made in accordance with an embodiment of the present invention.

Referring to FIG. 1, there is illustrated an apparatus made in accordance with an embodiment of the present invention. The apparatus includes a display 20 having a screen 22. The display 20 may be used as the display for a system 24. The system 24 may comprise any type of system, such as for example any type of computer, television, stereo, network device, etc. The illustrated apparatus may be used for controlling the system 24.

A camera, sensor, or other video image capturing device 26 is positioned so that at least a portion of its field-of-view 28 is directed across the screen 22 of the display 28. The camera 26 may be mounted at the edge of the screen 22, looking substantially parallel to the screen 22. In some embodiments the camera 26 is configured to track in three dimensions an object moving in a space in front of the screen. By way of example, the object may comprise a person's finger, hand, arm, or other object, such as a pointer or the like. This configuration allows a finger/hand that comes within a few inches of the screen to be tracked in one, two or three dimensions by its position in the video image taken by the camera 26. If the camera 26 is dedicated to this tracking function, then a camera with a 90 degree field-of-view may be used with it being mounted in the corner of the screen as shown.

Input may be provided to the system 24 based on the tracking of the person's finger or other object. For example, the output of the camera 26 may be provided to the system 24. Software and/or hardware included in the system 24 may be used to perform the tracking by determining the position of the person's finger or other object in the video image of the camera 26 and the distance between the finger and the camera 26. The point where the two positions intersect gives the location to which the finger is pointing on the screen 22. That is, the distance between the finger and the camera, together with the position of the finger in the video image, may be used to determine the location on the screen 22 to which the finger is pointing. This location may be provided in terms of its X-Y coordinates.

The distance between the person's finger or other object and the camera may be determined in various different ways. By way of example, in some embodiments the size of the finger in the video image taken by the camera may be determined, which is then used to determine how far the finger is from the camera. Or, in some embodiments, the distance between the finger and the camera is determined by illuminating the finger with a light and then inferring the distance based on the brightness of the finger. That is, if the light source is located near the camera lens, the closer the finger is to the camera the brighter it will be. The distance between the person's finger and the camera, along with the position of the person's finger in the video image taken by the camera, may be used to track the finger.

In embodiments where the camera is configured to track in three dimensions, the depth of the finger is also tracked. That is, the distance between the finger and the screen, or its Z coordinate, is also tracked. The distance between the finger and the screen may be determined from the position of the finger in the video image. It should be well understood that tracking in three dimensions is performed by some embodiments of the present invention and that tracking in two dimensions or only one dimension is performed by other embodiments of the present invention.

A computer may be used to process the video and track the finger, but depending on the setup used this computer may not have to be very powerful as the image recognition it needs to do is fairly simple. A setup that can find a finger within a 16×16 grid is sufficient to do effective user interfaces. It should be well understood, however, that in other embodiments the resolution may be made considerably better. Image processing may be performed to separate the image of the finger from the background image captured by the camera. Such image processing, which is known in the art, looks at the background image when nothing is there and then subtracts it when the finger appears.

The ability to provide input to the system 24 based on the tracking of the person's finger may be used to provide a user interface that allows simulation of mouse click and drag operations. For example, a person may use his or her finger to manipulate a cursor or pointer 30 on the screen 22 and click on hypertext links or other items 32 similar to the way a mouse moves a cursor on a computer screen. This also provides a touch screen-like user interface that does not require actual touching of the screen. By way of example, such an interface system may be used with TVs, such as big-screen TVs, to allow the screen thereof to be used as a touch screen that does not actually get touched by the finger. Such a user interface may also be used in conjunction with computers, entertainment systems, game consoles, home servers, internet-enabled TVs, etc.

Figure 2:
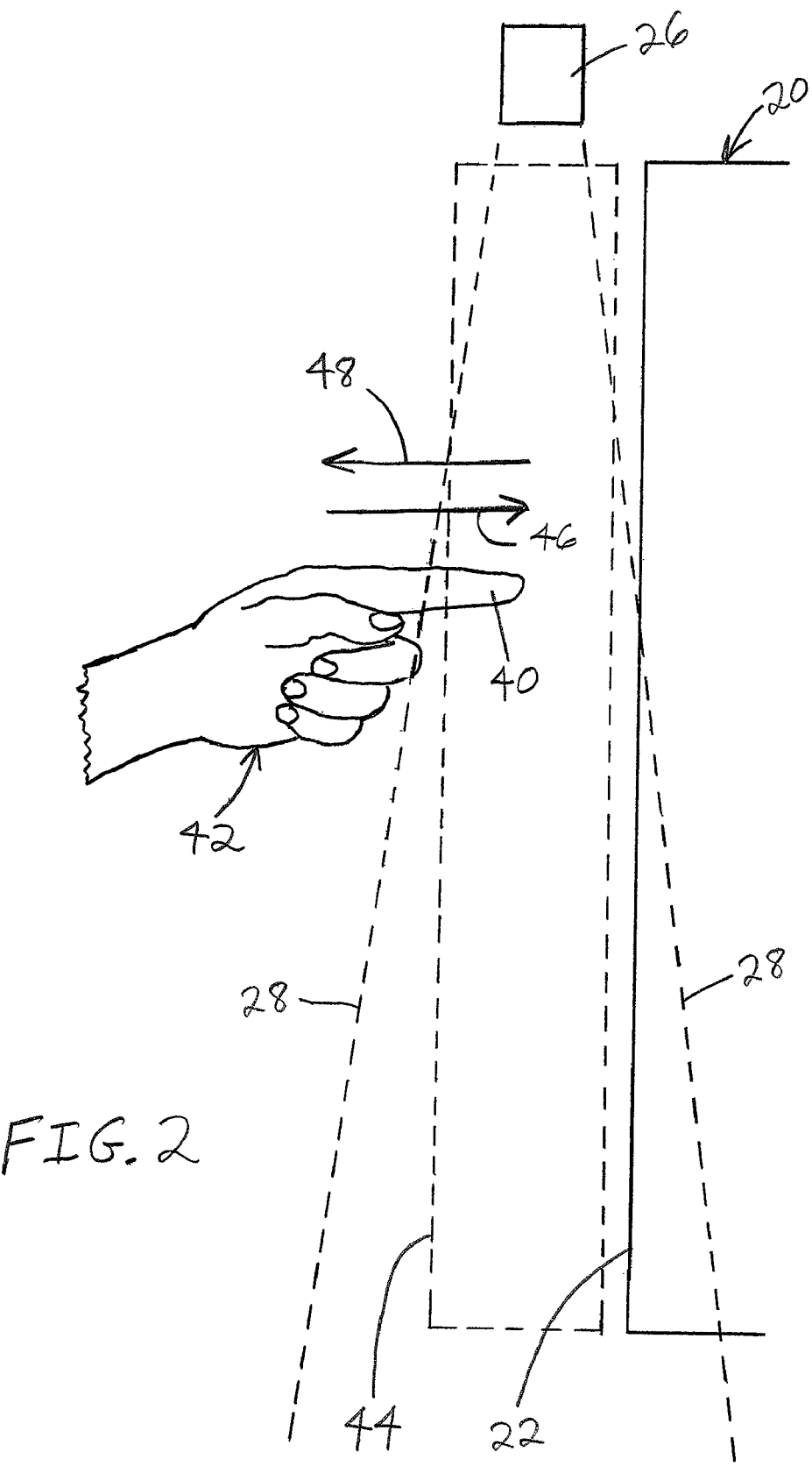
FIGS. 2 and 3 are side views of the apparatus shown in FIG. 1 illustrating operations thereof in accordance with embodiments of the present invention.

Referring to FIG. 2, there is illustrated a side view of the display 20. In the example where the display 20 comprises a big screen TV, it is fairly common for such TV screens to be mounted at roughly chest height. This mounting is convenient for the user in that the user does not have to bend down to reach it, but such a mounting is certainly not required.

In some embodiments, when the camera 26 is mounted as described above, it may be used to track a finger 40 or hand 42 moving in three dimensions through a space 44 in front of the screen 22. Moving the finger 40 anywhere in this space 44 will move the cursor 30 (FIG. 1) on the screen 22 similarly to the way a mouse moves a cursor on a computer screen. That is, the camera 26 tracks the movement of the finger 40 and provides input to the system 24 (FIG. 1) that is used to move cursor 30 on the screen 22 in response thereto. As mentioned above, in embodiments where the camera 26 is configured to track in three dimensions, the depth of the finger 40 into the space 44 is also tracked. This means that the distance between the finger 40 and the screen 22 is tracked.

The space 44 in front of the screen 22 may comprise many different sizes and depths. For example, the space 44 may be less than one inch deep or up to several inches deep. As another example, the space 44 may be about two inches deep. But again, the space 44 may comprise many different sizes and depths.

In some embodiments, to simulate a mouse click the user would make a sharp poke 46 and withdraw motion 48 at the screen 22 without actually touching it. That is, the finger 40 would move quickly closer and then farther away. The camera 26 tracks this motion of the finger 40 and provides the input to the system 24. An item 32 (FIG. 1) on the screen 22 may be selected in response to this input.

Figure 3:
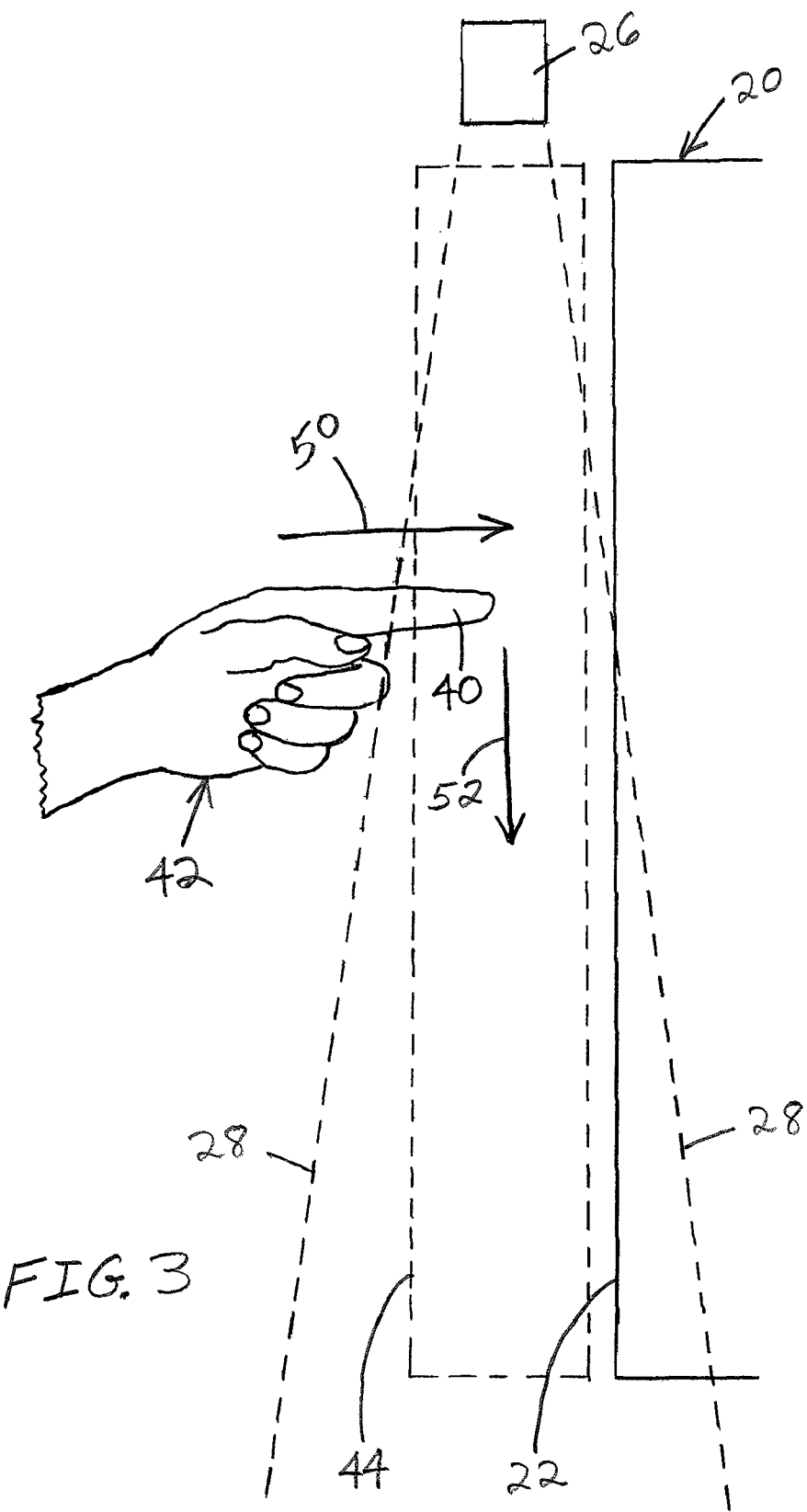

Referring to FIG. 3, in some embodiments, to drag an item or object the user would make the same sharp poking motion 50 at an item on the screen 22, but without withdrawing the finger 40. The user would then move his or her finger 40 in a direction 52 substantially parallel to the surface of the screen 22 so as to "drag" the item. Again, the camera 26 tracks this motion of the finger 40 and provides the input to the system 24 (FIG. 1). An item on the screen may be "dragged" in response to this input.

This ability to simulate mouse click and drag operations allows for a user interface designed for a normal mouse. For example, all traditional mouse interactions such as click, select/drag, scroll bars, checkboxes, etc., may be supported with this interface. Navigating web pages in a browser may be performed in the same manner as with a normal mouse. In addition, applications may be specifically designed for use with this interface. For example, an application specifically designed for use with this interface could use simpler techniques or add other gestures for special functions, such as drawing a circle around objects to select.

In some embodiments the interface may use audio/visual feedback to assist the user. For example, in some embodiments a correctly executed "click" gesture generates a click sound and a visual highlight on the screen. Furthermore, in some embodiments, a feedback technique may be used for training the user to avoid actually touching the screen. In such embodiments an indication may be provided to the user that his or her finger or other object is within a certain distance from the screen. By way of example, the indication may comprise an audio indication, a visual indication, or some other indication. By way of further example, to help train the user to use the interface without actually touching the screen, the system may emit a soft sound (like a hum, for example) when the finger is in proper tracking position. If the finger comes too close to the screen, a sharp increase in volume occurs to prompt the user to pull his or her hand back. This feature takes advantage of the user's normal reflex action to shy away and pull back his or her hand on hearing a sharp sound.

Figure 4:
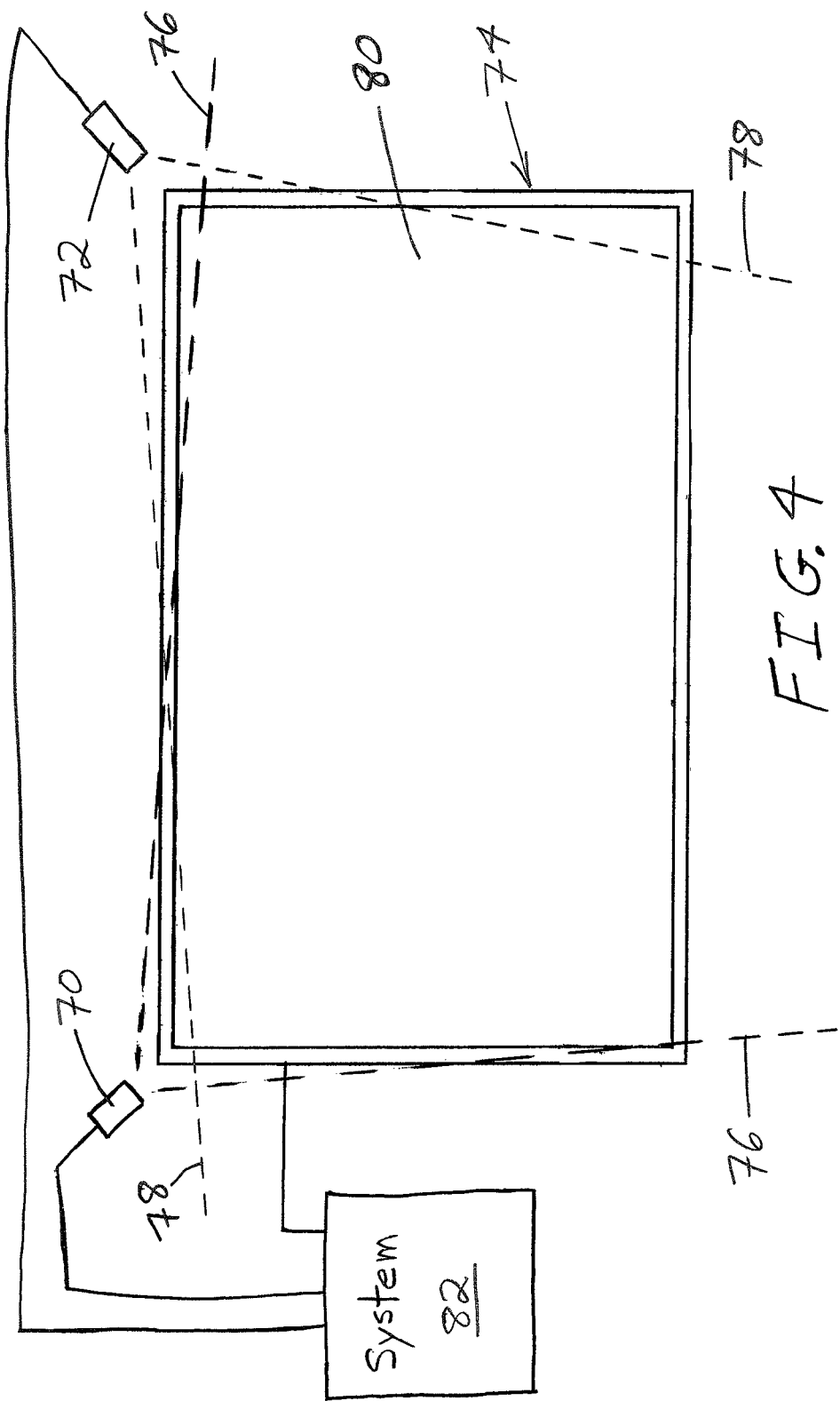
FIG. 4 is a block diagram illustrating an apparatus made in accordance with another embodiment of the present invention.

Referring to FIG. 4, there is illustrated an apparatus made in accordance with another embodiment of the present invention. In this embodiment two cameras 70, 72 are mounted in the corners of the display 74 pointed at right angles to each other. The two cameras 70, 72 are positioned so that their field-of-views 76, 78 look substantially parallel to the surface of the screen 80. The two cameras 70, 72 may be used to track the user's finger or other object similar to as described above and provide input to the system 82 in response to such tracking.

While only one camera or sensor is needed for basic interaction as described above, two cameras or sensors may be used for enhanced precision. That is, with two cameras the tracking can be more precise and requires less computing power because it is based on position only. Namely, each camera determines the position of the finger in its field-of-view. The point where the two positions intersect gives the location to which the finger is pointing on the screen. This location may be provided in terms of its X-Y coordinates. Less computing power is needed because the distance between the finger and the camera does not have to be determined. For example, the size of the finger or the brightness of the finger does not have to be determined. Instead, the tracking is performed by determining the position of the finger or other object in the video image of each of the two cameras.

In embodiments where the two cameras are configured to track in three dimensions, the depth of the finger is also tracked. That is, the distance between the finger and the screen, or its Z coordinate, is also tracked. The distance between the finger and the screen may be determined from the position of the finger in the video images. It should be well understood that tracking in three dimensions is performed by some embodiments of the present invention and that tracking in two dimensions or only one dimension is performed by other embodiments of the present invention.

In the illustrated embodiment the two cameras 70, 72 are mounted at two adjacent corners of the screen. It should be well understood, however, that the cameras 70, 72 may be mounted at other locations. For example, the cameras 70, 72 may be mounted in other locations such that the field-of-view of each camera 76, 78 covers the portion of the screen 80 where the interface is to be implemented. That is, the interface may be implemented across most or all of the screen 80, or only a portion of the screen 80.

Figure 5:
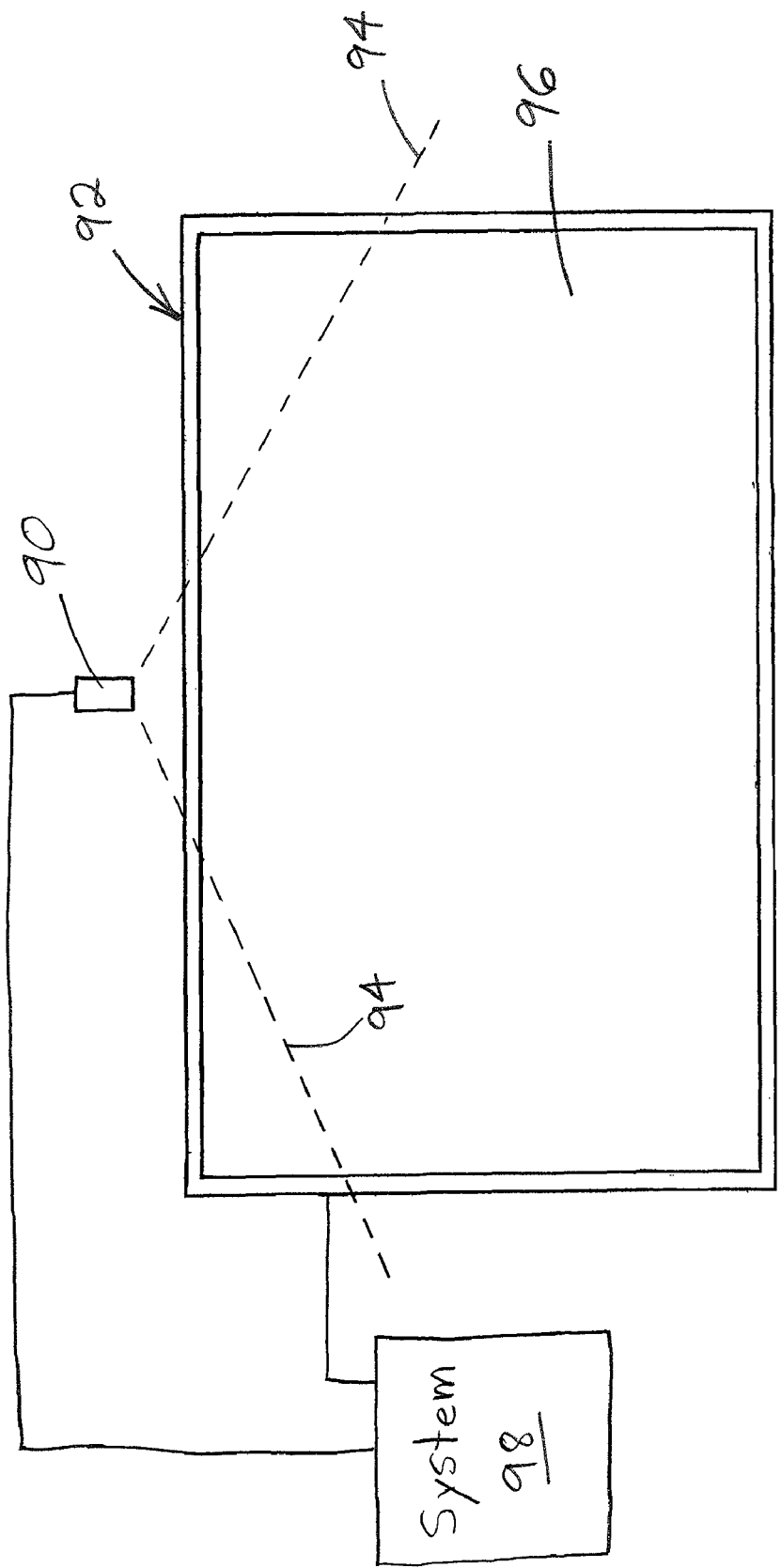
FIG. 5 is a block diagram illustrating an apparatus made in accordance with another embodiment of the present invention.

Similarly, if only one camera is used it may be positioned at other locations and not just the location shown in FIG. 1. For example, FIG. 5 illustrates an apparatus made in accordance with another embodiment of the present invention. In this embodiment only one camera 90 is used and it is mounted at the top of the display 92 in the center. The camera 90 may be used to track the user's finger or other object similar to as described above and provide input to the system 98 in response to such tracking. The camera 90 is illustrated having a very wide field-of-view 94 that covers most of the screen 96. However, it should be well understood that in other embodiments the camera 90 may have a more narrow field-of-view such that the interface is implemented across only a portion of the screen 96.

It should be well understood that three-dimensional tracking may be performed using any number of cameras, including only a single camera. Additional cameras may be used in some embodiments to improve the precision of the tracking and reduce the amount of computer resources needed to do it.

In both the one camera embodiments (e.g. FIGS. 1 and 5) and the two camera embodiments (e.g. FIG. 4), as well as other embodiments (not shown) that include three or more cameras, the cameras may comprise any type of camera, sensor, or other video image capturing device. For example, the cameras or sensors may comprise low cost video cameras and do not have to be full-frame sensors or high resolution. By way of further example, the cameras may comprise line-scan cameras between one and ten pixels high and several hundred pixels across. Camera chips with missing pixels/scan lines due to manufacturing failures may also be used because a perfect image is not required. In addition, in some embodiments different lenses may be used with the cameras or sensors to adjust or provide different field-of-views.

Figure 6:
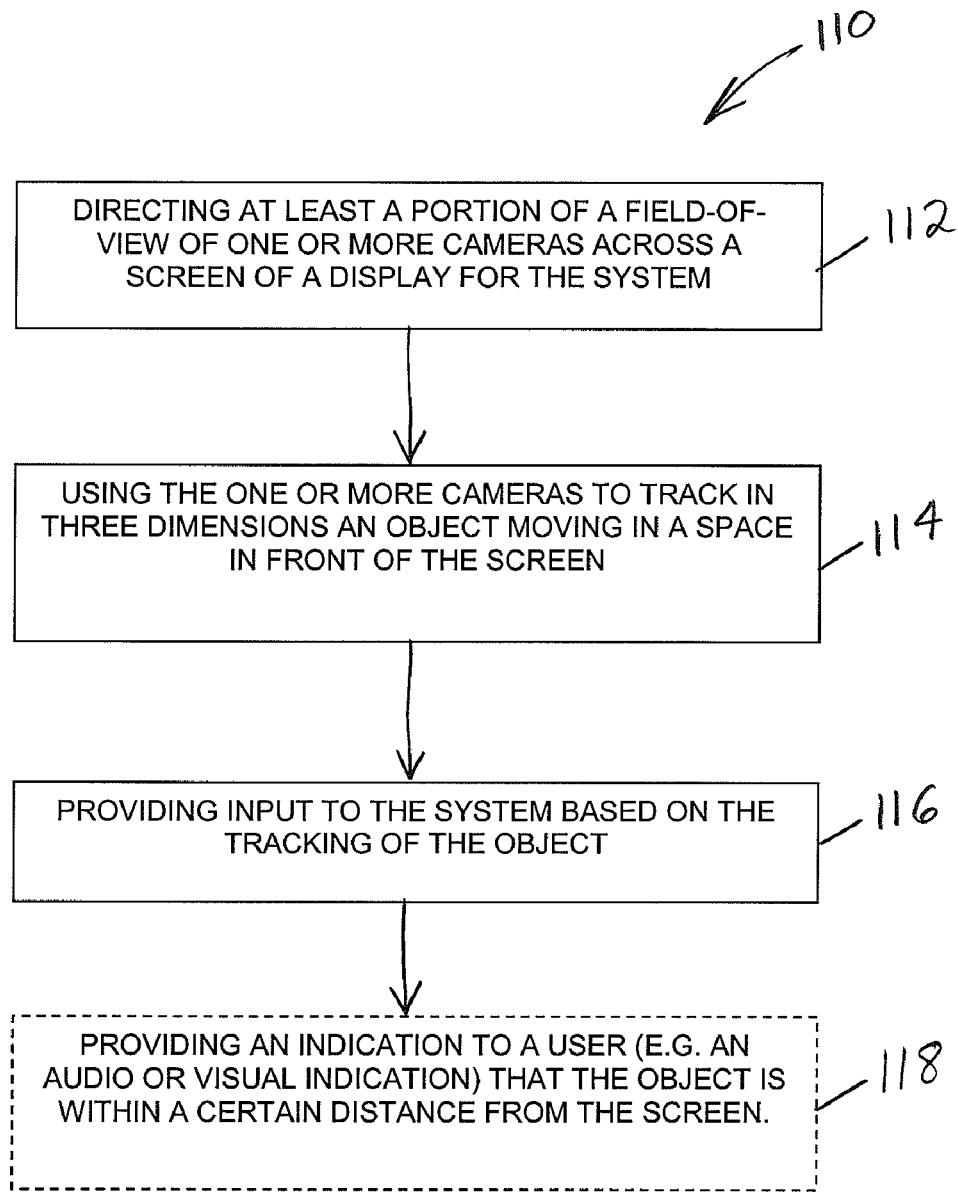
FIG. 6 is a flow diagram illustrating a method for use in controlling a system in accordance with an embodiment of the present invention.

Referring to FIG. 6, there is illustrated a method 110 in accordance with an embodiment of the present invention that may be used for practicing embodiments of the above-described techniques. The method 110, which may be used in controlling a system, begins in step 112 where at least a portion of a field-of-view of one or more cameras is directed across a screen of a display for the system. In step 114 the one or more cameras are used to track in three dimensions an object moving in a space in front of the screen. And in step 116 input is provided to the system based on the tracking of the object.

Step 118, which may be used in some embodiments, is an optional step and is therefore shown in dashed lines. In step 118 an indication may be provided to a user that the object is within a certain distance from the screen. As discussed above, in some embodiments such a feedback technique may be used for training the user to avoid actually touching the screen. The indication may comprise, for example, an audio indication, a visual indication, such as a visual indication on the screen, or some other indication.

Figure 7:
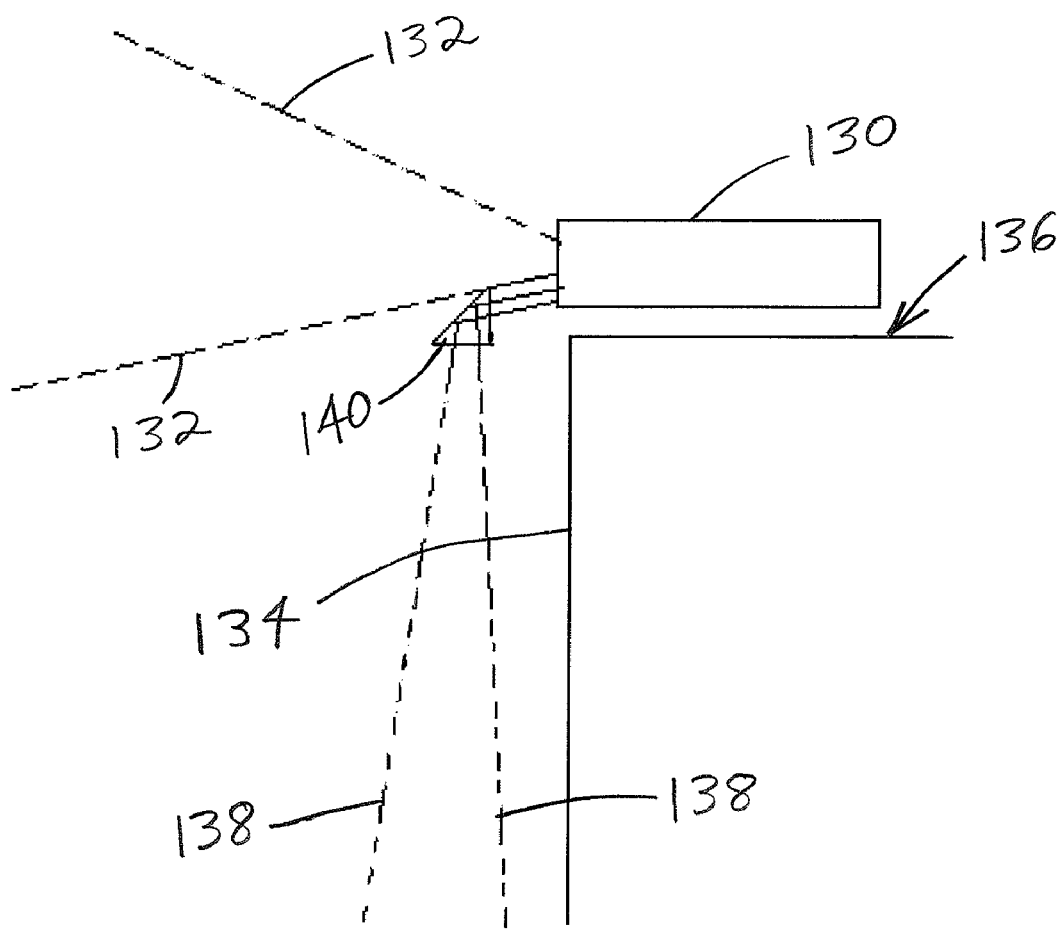
FIG. 7 is a block diagram illustrating an apparatus made in accordance with another embodiment of the present invention.

Referring to FIG. 7, there is illustrated an apparatus made in accordance with another embodiment of the present invention. In this embodiment one camera 130 is used for two functions. Namely, a first portion 132 of the field-of-view of the camera 130 is directed in a first direction. By way of example, the first direction may be a forward-looking direction, e.g. a direction looking away from and substantially perpendicular to the surface of the screen 134 of the display 136. This portion 132 of the field-of-view of the camera 130 may be used for any purpose, such as for a conventional webcam, video conferencing camera, or the like.

A second portion 138 of the field-of-view of the camera 130 is directed in a second direction across the screen 134 of the display 136 for the system. This portion 138 of the field-of-view of the camera 130 may be used for implementing the tracking function described above. Namely, an object, such as a person's finger or hand, moving in front of the screen 134 is tracked with the second portion 138 of the field-of-view of the camera 130. As described above, input may be provided to the system based on the tracking of the object for use in controlling the system.

Thus, in this embodiment the camera 130 may be simultaneously used for its regular function and as a sensor for the tracking and user interface system described herein. By way of example, a special lens may be used to allow the camera 130 to be used as a sensor for the screen for the tracking function and still allow it to perform its usual function as a forward-looking camera.

In one embodiment, a prism 140 may be used to direct the second portion 138 of the field-of-view of the camera 130 in the second direction across the screen 134 of the display 136. For example, a special lens may include a prism-like portion at the lower edge which allows the bottom few scan lines of the camera 130 to look down across the screen 134 while the majority of the camera's pixels still look forward towards the user. The prism 140 may be curved or otherwise shaped to give this portion of the camera's view a different focus and/or field-of-view than the main view. That is, the prism-like portion may be used to adjust the focus or field-of-view of the downward looking portion.

In some embodiments the operating system or a device driver may create two virtual devices for the system, i.e. one device looking forward and one device looking downward. Each frame received from the camera 130 is broken into these two views. This way existing software for the camera 130 would not have to be modified to ignore the downward looking portion of the image. Thus, such a lens system allows the camera 130 to be used for its original function and for touch tracking simultaneously.

By way of example, the camera 130, as well as any of the other cameras or sensors described herein, may comprise a camera peripheral device such as the commercially available EyeToy® USB camera product. But it should be well understood that any type or brand of camera may be used, such as for example a web-cam camera, add-on USB camera, infrared (IR) capability camera, fast frame capture rate camera, etc.

Figure 8:
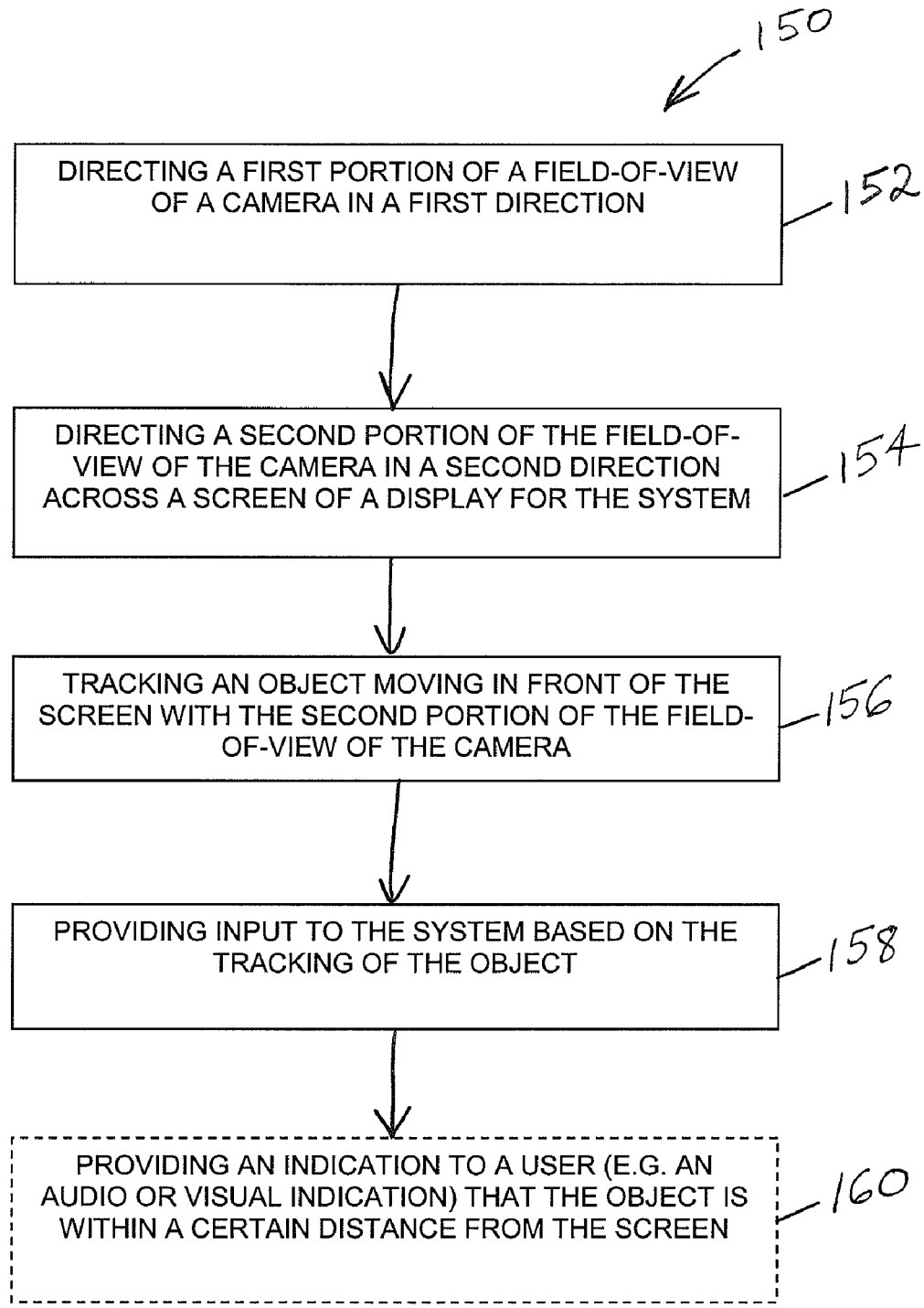
FIG. 8 is a flow diagram illustrating a method for use in controlling a system in accordance with another embodiment of the present invention.

Referring to FIG. 8, there is illustrated a method 150 in accordance with an embodiment of the present invention that may be used for practicing embodiments of the above-described techniques. The method 150, which may be used in controlling a system, begins in step 152 where a first portion of a field-of-view of a camera is directed in a first direction. In step 154 a second portion of the field-of-view of the camera is directed in a second direction across a screen of a display for the system. In step 156 an object moving in front of the screen is tracked with the second portion of the field-of-view of the camera. This tracking is not limited to any specific dimension of tracking and may comprise tracking in one, two, three, or more dimensions. Finally, in step 158 input is provided to the system based on the tracking of the object.

Step 160, which may be used in some embodiments, is an optional step and is therefore shown in dashed lines. In step 160 an indication may be provided to a user that the object is within a certain distance from the screen. Step 160 may be used with embodiments where three dimensional or greater tracking is implemented since the distance between the object and the screen is monitored. Again, as discussed above, in some embodiments such a feedback technique may be used for training the user to avoid actually touching the screen. The indication may comprise an audio indication, a visual indication, or some other indication.

The apparatus and methods described herein have many uses and applications. A user interface that uses the tracking methods and features described herein may be used for any use, including short casual interactions where it is more convenient to just walk up to the TV than it is to find the remote control, keyboard or mouse. In some embodiments bringing a hand near the TV screen may automatically turn on the TV so no other devices would be necessary. This makes it ideal for controlling a home server/home automation system. This could be done through a web-page style interface or with an interface specifically designed for use with embodiments of the interface described herein.

Examples of the sort of common tasks the methods and features described herein may be used for include: short casual interactions with home computers, networks, etc.; checking the weather or traffic before leaving for work; buying movie tickets; ordering pizza for delivery; paying a bill with on-line banking; selecting from a list of the morning's news stories that a user wants to watch or listen to while getting ready for work; picking a playlist of music, podcast or radio channel; checking the TV schedule, selecting programs to record on a DVR/Tivo device, deleting programs from storage, etc.; organizing photos copied from a digital camera by dragging them into folders/albums; controlling home automation devices such as lighting, window-blinds, background music, door locks, security/alarm systems, etc.; making voice/videophone calls from an address book or adding a name to an address book; syncing with or backing up a cell phone address book; sending short E-mails or text messages using an on-screen keyboard; controlling parental lock-outs, setting up what kinds of shows and when the kids can watch, and entering the codes to override the restrictions when the parents want to watch; reading E-Mail, either on-screen or choosing which messages the user wants a mail agent to read out-loud; and choosing which phone messages to listen to or delete from an integrated voice-mail system. All of these tasks can be performed with a remote control or voice recognition, but for quick interactions and picking things from lists, embodiments of the user interface described herein is much more convenient.

Figure 9:
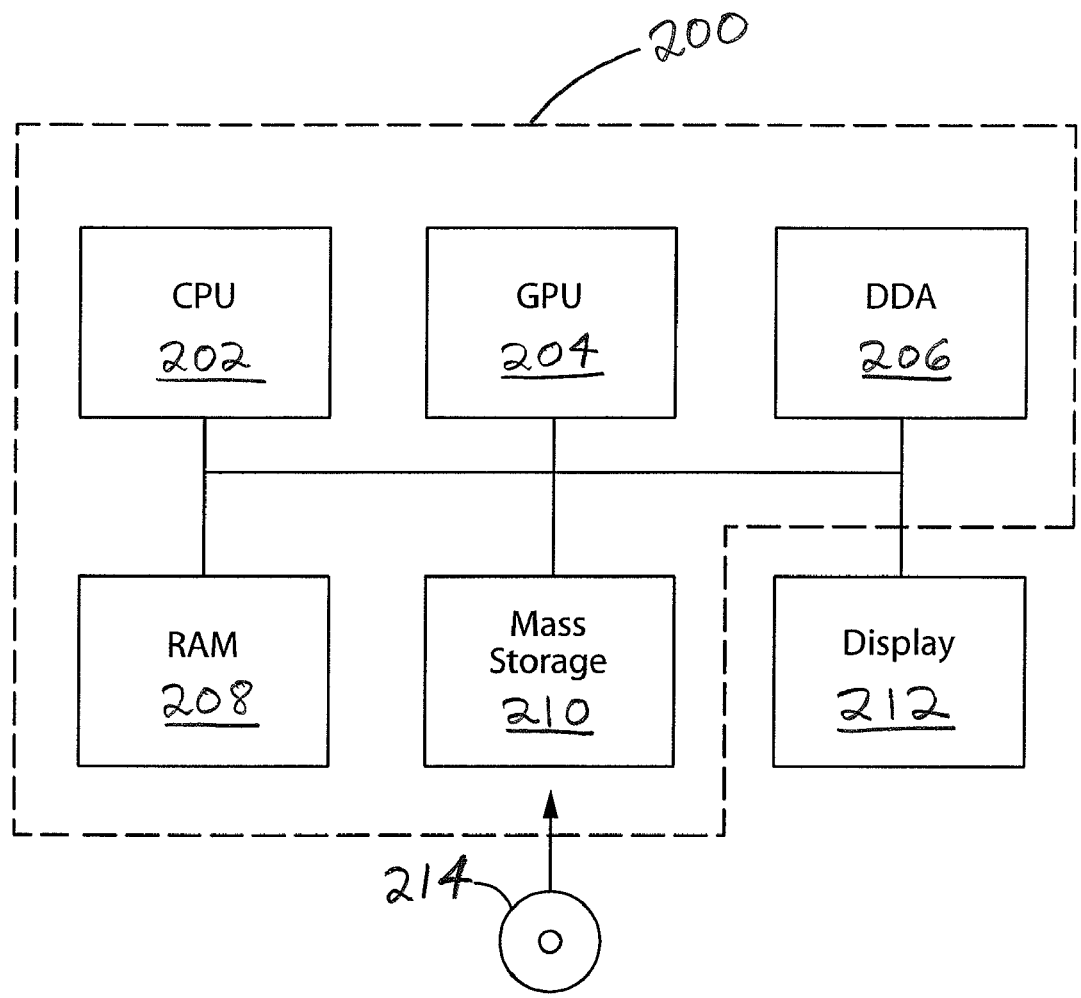
FIG. 9 is a block diagram illustrating a system that may be used to run, implement and/or execute the methods and techniques shown and described herein in accordance with embodiments of the present invention.

The methods and techniques described herein may be utilized, implemented and/or run on many different types of computers, graphics workstations, televisions, entertainment systems, video game systems, DVD players, DVRs, media players, home servers, video game consoles, and the like. Referring to FIG. 9, there is illustrated a system 200 that may be used, for example, as the system 24 (FIG. 1), the system 82 (FIG. 4), and/or the system 98 (FIG. 5). However, the use of the system 200 in any of those embodiments is certainly not required.

By way of example, the system 200 may include, but is not required to include, a central processing unit (CPU) 202, a graphics processing unit (GPU) 204, digital differential analysis (DDA) hardware 206, a random access memory (RAM) 208, and a mass storage unit 210, such as a disk drive. The system 200 may be coupled to, or integrated with, a display 212, such as for example any type of display, including any of the types of displays mentioned herein.

The CPU 202 and/or GPU 204 can be used to execute or assist in executing the steps of the methods and techniques described herein, and various program content and images can be rendered on the display 212. Removable storage media 214 may optionally be used with the mass storage unit 210, which may be used for storing code that implements the methods and techniques described herein. However, any of the storage devices, such as the RAM 208 or mass storage unit 210, may be used for storing such code. Either all or a portion of the system 200 may be embodied in any type of device, such as for example a television, computer, video game console or system, or any other type of device, including any type of device mentioned herein.

While the invention herein disclosed has been described by means of specific embodiments and applications thereof, numerous modifications and variations could be made thereto by those skilled in the art without departing from the scope of the invention set forth in the claims.

What is claimed is:

1. A method for use in controlling a system, comprising the steps of:

directing a first portion of a field-of-view of a camera in a first direction;

directing a second portion of the field-of-view of the camera in a second direction across a screen of a display for the system;
using the camera to track in three dimensions an object moving in a space in front of the screen with the second portion of the field of view of the camera; and
providing input to the system based on the tracking of the object; and
wherein the first portion of the field-of-view of the camera is not used for tracking the object;
wherein the tracking in three dimensions is based on determining a position of the object in a video image of one of the camera and a distance between the object and the one camera; and
wherein the tracking in three dimensions is based on only one view across the screen of the display of the system.

2. A method in accordance with claim 1, further comprising the step of:
providing an indication to a user that the object is within a certain distance from the screen.

3. A method in accordance with claim 2, wherein the indication comprises an audio indication.

4. A method in accordance with claim 2, wherein the indication comprises a visual indication.

5. A method in accordance with claim 1, further comprising the step of:
moving a cursor on the screen in response to the input provided to the system.

6. A method in accordance with claim 1, further comprising the step of:
selecting an item on the screen in response to the input provided to the system.

7. A method in accordance with claim 6, wherein the step of selecting is performed in response to movement of the object comprising a sharp poke and withdraw motion at the screen.

8. A method in accordance with claim 1, further comprising the step of:
dragging an item on the screen in response to the input provided to the system.

9. A method in accordance with claim 8, wherein the step of dragging is performed in response to movement of the object comprising a sharp poke at the item on the screen and then movement substantially parallel to a surface of the screen.

10. A method in accordance with claim 1, wherein the object comprises a person's finger.

11. An apparatus for use in controlling a system, comprising:
a camera that is configured so that a first portion of its field-of-view is directed in a first direction and a second portion of its field-of-view is directed in a second direction across a screen of a display for the system;
wherein the camera is configured to track in three dimensions an object moving in a space in front of the screen with the second portion of the field-of-view of the camera; and
means for providing input to the system based on the tracking of the object; and
wherein the first portion of the field-of-view of the camera is not used for tracking the object;
wherein the camera is configured to track in three dimensions based on determining a position of the object in a video image of the camera and a distance between the object and the one camera; and
wherein the tracking in three dimensions is based on only one view across the screen of the display of the system.

12. An apparatus in accordance with claim 11, further comprising:
means for providing an indication to a user that the object is within a certain distance from the screen.

13. An apparatus in accordance with claim 12, wherein the indication comprises an audio indication.

14. An apparatus in accordance with claim 12, wherein the indication comprises a visual indication.

15. An apparatus in accordance with claim 11, further comprising:
means for moving a cursor on the screen in response to the input provided to the system.

16. An apparatus in accordance with claim 11, further comprising:
means for selecting an item on the screen in response to the input provided to the system.

17. An apparatus in accordance with claim 16, wherein the means for selecting is configured to perform the selecting in response to movement of the object comprising a sharp poke and withdraw motion at the screen.

18. An apparatus in accordance with claim 11, further comprising:
means for dragging an item on the screen in response to the input provided to the system.

19. An apparatus in accordance with claim 18, wherein the means for dragging is configured to perform the dragging in response to movement of the object comprising a sharp poke at the item on the screen and then movement substantially parallel to a surface of the screen.

20. An apparatus in accordance with claim 11, wherein the object comprises a person's finger.

21. A method for use in controlling a system, comprising the steps of:
directing a first portion of a field-of-view of a camera in a first direction;
directing a second portion of the field-of-view of the camera in a second direction across a screen of a display for the system;
tracking in three dimensions an object moving in front of the screen with the second portion of the field-of-view of the camera; and
providing input to the system based on the tracking of the object;
wherein the first portion of the field-of-view of the camera is not used for tracking the object; and
wherein the tracking in three dimensions is based on only one view across the screen of the display of the system.

22. A method in accordance with claim 21, wherein the step of directing a second portion of the field-of-view of the camera comprises:
using a prism to direct the second portion of the field-of-view of the camera in the second direction across the screen of the display.

23. A method in accordance with claim 21, wherein the first direction comprises a direction that is substantially perpendicular to a surface of the screen.

24. A method in accordance with claim 21, further comprising the step of:
providing an indication to a user that the object is within a certain distance from the screen.

25. A method in accordance with claim 21, further comprising the step of:
moving a cursor on the screen in response to the input provided to the system.

26. A method in accordance with claim 21, further comprising the step of:
 selecting an item on the screen in response to the input provided to the system.

27. A method in accordance with claim 21, further comprising the step of:
 dragging an item on the screen in response to the input provided to the system.

28. A method in accordance with claim 21, wherein the object comprises a person's finger.

29. An apparatus for use in controlling a system, comprising:
 a camera that is configured so that a first portion of its field-of-view is directed in a first direction and a second portion of its field-of-view is directed in a second direction across a screen of a display for the system;
 wherein the camera is further configured to track in three dimension an object moving in front of the screen with the second portion of the field-of-view of the camera;
 means for providing input to the system based on the tracking of the object; and
 wherein the first portion of the field-of-view of the camera is not used for tracking the object; and
 wherein the tracking in three dimensions is based on only one view across the screen of the display of the system.

30. An apparatus in accordance with claim 29, further comprising:
 a prism that is used in configuring the camera to direct the second portion of the field-of-view of the camera in the second direction across the screen of the display.

31. An apparatus in accordance with claim 29, wherein the first direction comprises a direction that is substantially perpendicular to a surface of the screen.

32. An apparatus in accordance with claim 29, further comprising:
 means for moving a cursor on the screen in response to the input provided to the system.

33. An apparatus in accordance with claim 29, further comprising:
 means for selecting an item on the screen in response to the input provided to the system.

34. An apparatus in accordance with claim 29, further comprising:
 means for dragging an item on the screen in response to the input provided to the system.

35. An apparatus in accordance with claim 29, wherein the object comprises a person's finger.

* * * * *